(12) United States Patent
Nakajo

(10) Patent No.: US 6,504,806 B1
(45) Date of Patent: Jan. 7, 2003

(54) OPTICAL DISK RECORDING APPARATUS

(75) Inventor: Yukihisa Nakajo, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/536,907

(22) Filed: Mar. 28, 2000

(30) Foreign Application Priority Data

Mar. 30, 1999 (JP) .......................................... 11-089811

(51) Int. Cl.$^7$ ............................................... G11B 5/09
(52) U.S. Cl. ................................................. 369/59.12
(58) Field of Search ............................. 369/100, 59.11, 369/59.12, 116, 53.3, 53.37

(56) References Cited

U.S. PATENT DOCUMENTS

| | | | | |
|---|---|---|---|---|
| 4,787,075 A | * | 11/1988 | Matsuoka et al. | 235/454 |
| 5,485,449 A | * | 1/1996 | Nakajo | 369/100 |
| 5,548,573 A | * | 8/1996 | Takeuchi | 369/107 |
| 6,215,609 B1 | * | 4/2001 | Yamashita et al. | 360/73.03 |

* cited by examiner

Primary Examiner—William Korzuch
Assistant Examiner—Kim Lien T. Le
(74) Attorney, Agent, or Firm—Pillsbury Winthrop LLP

(57) ABSTRACT

Top-power increasing pulse is imparted to part of a top power irradiation period of a recording laser light beam, to temporarily increase the top power level of the light beam. For pits of a same length, control is performed on the top-power increasing pulse, which includes control to decrease a ratio, to a unit pit length, of a width of the top-power increasing pulse as the recording speed increase ratio is raised, control to decrease a ratio, to a difference between the top power level and the bottom power level, of a difference between a peak level of the top-power increasing pulse and the top power level as the recording speed increase ratio is raised, and/or control to increase a ratio, to a unit pit length, of a delay of a rise of the top-power increasing pulse from a start of the top power irradiation period as the recording speed increase ratio is raised. With such arrangements, signals can be recorded on an optical disk with improved quality even when the recording is performed using a high recording speed ratio.

9 Claims, 12 Drawing Sheets

OPTICAL DISK RECORDING APPARATUS

BACKGROUND OF THE INVENTION

The present invention relates generally to optical disk recording apparatus based on a mark-length recording scheme which irradiates a laser light beam onto a recording surface of an optical disk to form pits therein for recording of desired information. More particularly, the present invention relates an improved optical disk recording apparatus which provides for improved quality of recorded signals in a situation where the recording is performed at a higher recording speed than the normal (non-increased or one-time) recording speed.

Among various known standards for writable optical disks is the CD-WO (CD Write Once) standard that is also commonly known as the "Orange Book" standard. The CD-WO or Orange Book standard prescribes a recording strategy where a laser-light irradiation time period for forming a pit is set to the following length, for both the normal (non-increased or one-time) and double recording speeds, irrespective of a kind of dye material used in the recording layer of the optical disk:

$$(n-1)T + \Delta 3T$$

, where "nT" represents a length of the pit to be formed with "n" being a variable in the range of 3–11, and "3T" represents an extra pulse width to be applied to recording of a shortest 3T pit. Further, the "Orange Book II" standard prescribes that an top-power increasing pulse be imparted to an initial part of each pit-forming laser power irradiation period so as to temporarily increase the laser power level to thereby achieve improved signal quality. It is also prescribed that the top-power increasing pulse be 1.5T in pulse width and 20% of the recording laser power in amplitude.

However, through experiments conducted by the inventors of the present invention, it has been found that jitter characteristics in the recording based on the CD-WO standard tend to get worse as the recording speed increase ratio is raised.

SUMMARY OF THE INVENTION

It is therefore an object of the present invention to provide an optical disk recording apparatus which can overcome the problems encountered by the conventionally-known techniques and which can record signals on an optical disk with improved quality even when the recording is performed in a high recording speed ratio.

Generally, in recording at a relatively low speed such as the normal (one-time) or double speed, the recording laser power is relatively weak as illustratively shown in FIG. 2A and presents a weak rise at the beginning of each pit-forming period, so that an initial portion of the pit tends to be formed with a blurred outline. Consequently, unevenness would occur in the initial portions of the individual pits, which would result in great jitters in reproduced signals. For this reason, the CD-WO standard attempts to minimize the unwanted jitters by imparting a relatively great top-power increasing pulse to an initial part of each pit-forming period.

However, as the recording speed increases, for example, to the quadruple, six-times or eight-times speed, higher recording laser power is required as shown in FIG. 2B, and such higher recording laser power can effectively reduce the blur in the initial portion of the pits. If the top-power increasing pulse is imparted in the same ratio as in the lower-speed recording, the irradiated laser light beam would become so excessive in the initial part of the pit-forming periods that the heat of the laser light irradiated onto the disk is transmitted backward, i.e., in an opposite direction to the direction in which the recording advances. Such heat transmission would create unwanted variations in the lengths of lands of the optical disk, which have been considered to be a cause of increased jitters.

In view of such inconveniences encountered by the conventional techniques, the present invention provides an optical disk recording apparatus which is capable of recording information onto an optical disk in a variable recording speed increase ratio and which records the information by irradiating a recording laser light beam onto a recording surface of the optical disk with the recording laser light beam set to a top power level for each pit-forming period and to a bottom power level for each land-forming period between pit-forming periods, to thereby form pits and lands on the optical disk based on a mark-length recording scheme. The optical disk recording apparatus of the present invention is characterized by including a control section which performs control to impart a top-power increasing pulse to part of a top power irradiation period of the recording laser light beam to temporarily increase the top power level thereof and also performs, on the top-power increasing pulse, any one or a combination of the following control:

(a) control to decrease a ratio, to a unit pit length, of a width of the top-power increasing pulse as the recording speed increase ratio is raised, for pits of a same length;

(b) control to decrease a ratio, to a difference between the top power level and the bottom power level, of a difference between a peak level of the top-power increasing pulse and the top power level as the recording speed increase ratio is raised, for pits of a same length; and (c) control to increase a ratio, to a unit pit length, of a delay of a rise of the top-power increasing pulse from a start of the top power irradiation period as the recording speed increase ratio is raised, for pits of a same length.

The present invention arranged in the above-mentioned manner can prevent excessive laser power from being applied to an initial part of a pit-forming period and thus can effectively minimize unwanted jitters, by decreasing either one or both of the width and amplitude of the top-power increasing pulse as the recording speed increase ratio is raised; note that an increase in the top power level by the top-power increasing pulse can be represented by the "width x amplitude" of the top-power increasing pulse. Further, by delaying the start of impartment, i.e., the rise, of the top-power increasing pulse relative to the start of the top power irradiation period as the recording speed increase ratio is raised, the present invention can reliably prevent the heat by the application of the top-power increasing pulse from being transmitted backward to a preceding land of the disk, thereby minimizing unwanted jitters. Note that further control may be performed to not impart the top-power increasing pulse when the selected recording speed increase ratio is higher than a predetermined value.

In addition, the present invention can not only significantly improve the quality of signals recorded at a high recording speed (i.e., in a high recording speed increase ratio) but also reduce the recording laser power necessary for attaining a predetermined recording depth of pits. FIG. 3 shows pulse waveforms of the recording laser light which are designed to attain a uniform recording depth of pits by variously changing the amplitude of the top-power increasing pulse. In the figure, hatched sections each represent laser light energy used for recording, and they have a substantially same area. As shown, a peak power level Pb of the laser light beam is made lower as the amplitude of the top-power increasing pulse (i.e., Pb−Pt) is decreased. As a consequence, the life of a laser diode used to generate the recording laser light beam in the present invention can be prolonged to a considerable degree, or an inexpensive lower-performance laser diode can be employed.

According to another aspect of the present invention, there is provided an optical disk recording apparatus which is arranged to record information onto an optical disk in a variable or fixed recording speed increase ratio equal to or higher than the six-times recording speed, by irradiating a recording laser light beam onto a recording surface of the optical disk with the recording laser light beam set to a top power level for each pit-forming period and to a bottom power level for each land-forming period between pit-forming periods to thereby form pits and lands on the optical disk based on a mark-length recording scheme. This optical disk recording apparatus is characterized by including a control section which, in recording in the variable or fixed recording speed increase ratio, performs control to keep constant the top power level of the recording laser light beam without imparting a top-power increasing pulse to the top power irradiation period of the recording laser light beam.

The optical disk recording apparatus according to the other aspect of the invention is designed in consideration of the fact that the use of a high recording speed increase ratio can eliminate the need for the top-power increasing pulse, and is tailored to record any information in a variable or fixed recording speed increase ratio equal to or higher than the six-times recording speed without applying the top-power increasing pulse to the top power irradiation period of the recording laser light beam. This arrangement can dispense with all circuits pertaining to the impartment of the top-power increasing pulse, which thereby can significantly reduce the necessary costs of the optical disk recording apparatus.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE PREFERRED EMBODIMENTS

Figure 4:
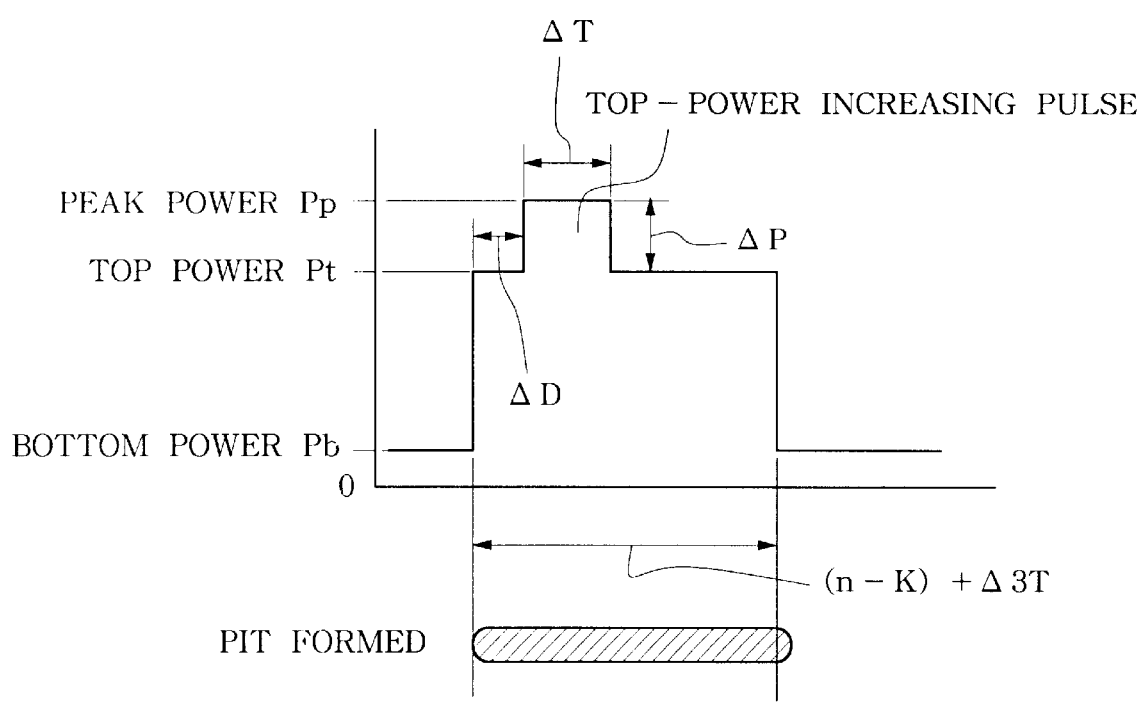
FIG. 4 is a graph showing an exemplary variation, over time, of the recording laser light beam.

The present invention will now be described as being applied to recording on an optical disk based on the CD-WO standard. Referring first to FIG. 4, there is shown an exemplary time variation pattern of recording laser power (i.e., a recording laser light beam) irradiation in one preferred embodiment of the present invention. In the embodiment, the laser light irradiation time is controlled as follows in accordance with lengths of pits nT (n=3, 4, . . . , 11) to be recorded in the optical disk:

$$(n-K)T+\Delta 3T$$

, where "K" is a constant that remains constant irrespective of the pit lengths as long as a same recording speed increase ratio is maintained and "3T" is an extra laser power value for addition to recording of a 3T pit. Also, in this embodiment, a top-power increasing pulse is imparted to an initial part of each pit-forming laser power irradiation period, so as to increase the recording laser power over a standard recording power level temporarily for a predetermined time period. Several reference characters used in the illustrated example of FIG. 4 have the following meanings:

Pb: bottom power level, i.e., a power level of the laser light beam generated when no pit is to be formed in the optical disk;

Pt: top power level, i.e., a steady-state level of the laser light beam generated when a pit is to be formed;

Pp: peak power level, i.e., a level of the top power with a top-power increasing pulse imparted thereto;

ΔP: amplitude of the top-power increasing pulse;

ΔT: width of the top-power increasing pulse; and

ΔD: delay of the rise of the top-power increasing pulse from a start of a top power or pit-forming laser power irradiation period.

As shown in FIG. 4, the recording laser light beam is held at the bottom power level Pb for each non-pit-forming (i.e., land-forming) laser power irradiation period. But, for each pit-forming laser power irradiation period, the recording laser light beam is raised to the top power level Pt and then the top-power increasing pulse of the amplitude ΔP and ΔT is additionally imparted to the top power level Pt with the time delay ΔD from the start of the top power irradiation. Note that in part of the non-pit-forming period, the recording laser light beam may be lowered below the above-mentioned bottom power level Pb, e.g., to a zero level.

FIGS. 5–10 are graphs illustrating 3T-land jitter characteristics observed in reproduction of signals recorded on a cyanine-based CD-R disk, using the recording laser light of FIG. 4, at the quadruple (four-times) and eight-times recording speeds while variously changing the values of the width ΔT, amplitude ΔP and delay ΔD of the top-power increasing pulse. In each of these figures, "β(%)" represented on the horizontal axis is defined, in the CD-WO standard, as a parameter pertaining to a target recording depth of a pit to be formed, which is commonly called a "target β". Specifically, the target β is defined as a ratio between positive (plus-side) and negative (minus-side) peak values A1 and A2 of a signal (high-frequency or HF signal) read out from the optical disk and also having d.c. components removed therefrom, which may therefore be represented by $$\beta = (A1-A2)/(A1+A2)\%$$

With a same recording speed increase ratio, the target β value becomes greater as the recording power increases but becomes smaller as the recording power decreases. Further, to keep the target β constant in a situation where the recording speed increase ratio is varied, it is necessary to increase the power level of the recording laser light beam as the recording speed increase ratio is raised. According to the CD-WO standard, it is prescribed that the 3T jitters be within a length of 35 nsec when the target β value is set to be in a range of 0–8%. This condition should be made more stringent as the recording speed increase ratio is raised.

On the basis of the time variation patterns of FIGS. 5–10, the preferred embodiment of the present invention determines respective appropriate values of the width ΔT, amplitude ΔP and delay ΔD of the top-power increasing pulse, for every recording speed increase ratio, such that the jitters can be reduced to a sufficient degree. In the following description, the amplitude ΔP of the top-power increasing pulse is represented by "P/(Pt–Pb)" (%). Further, the width ΔT and delay ΔD of the top-power increasing pulse are each represented by a ratio to the length of a unit pit (1T pit) corresponding to a recording speed increase ratio selected;

the length of the unit pit (1T pit) is 231.3 nsec at the normal recording speed, ½ of 231.3 nsec at the double recording speed, ¼ of 231.3 nsec at the quadruple recording speed, and so on.

(1) WidthΔ T

Figure 5:
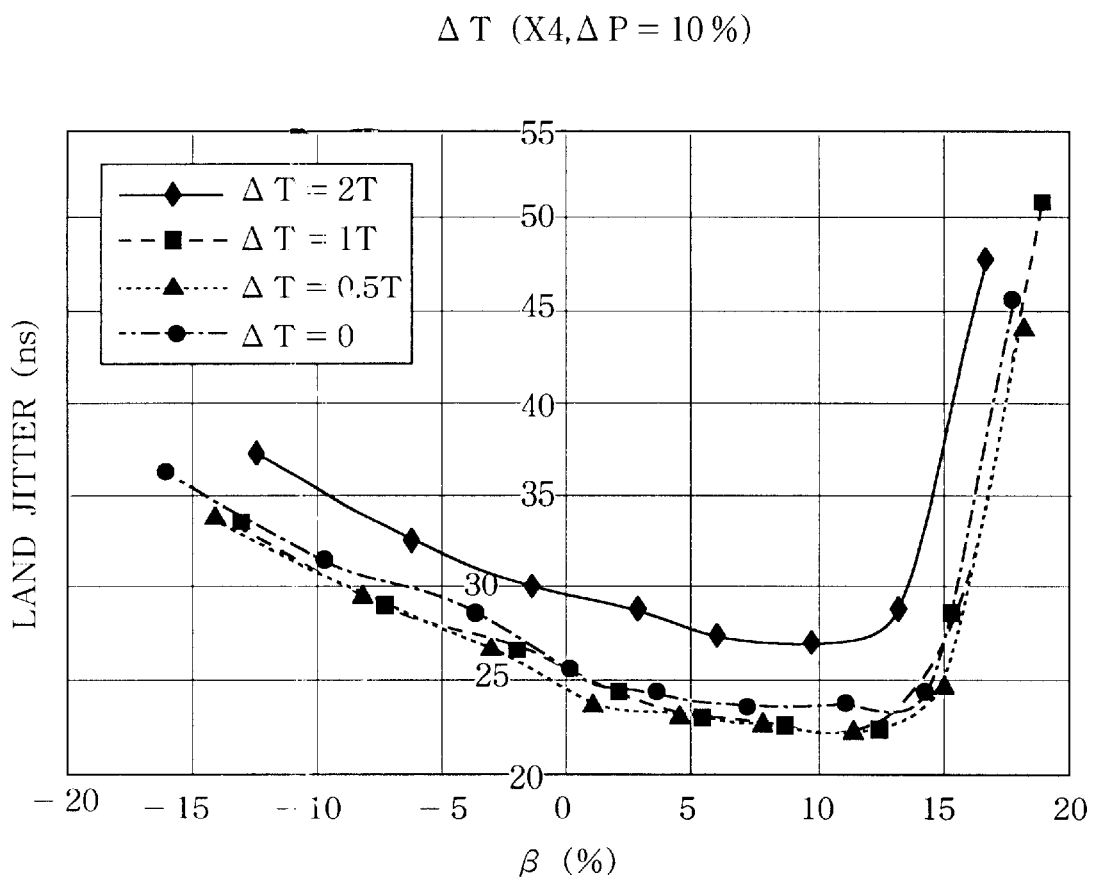
FIG. 5 is a graph illustrating 3T-land jitter characteristics observed in reproduction of signals recorded on a cyanine-based optical disk, using the recording laser beam power of FIG. 4, at a quadruple recording speed while variously changing a width of a top-power increasing pulse.
Figure 6:
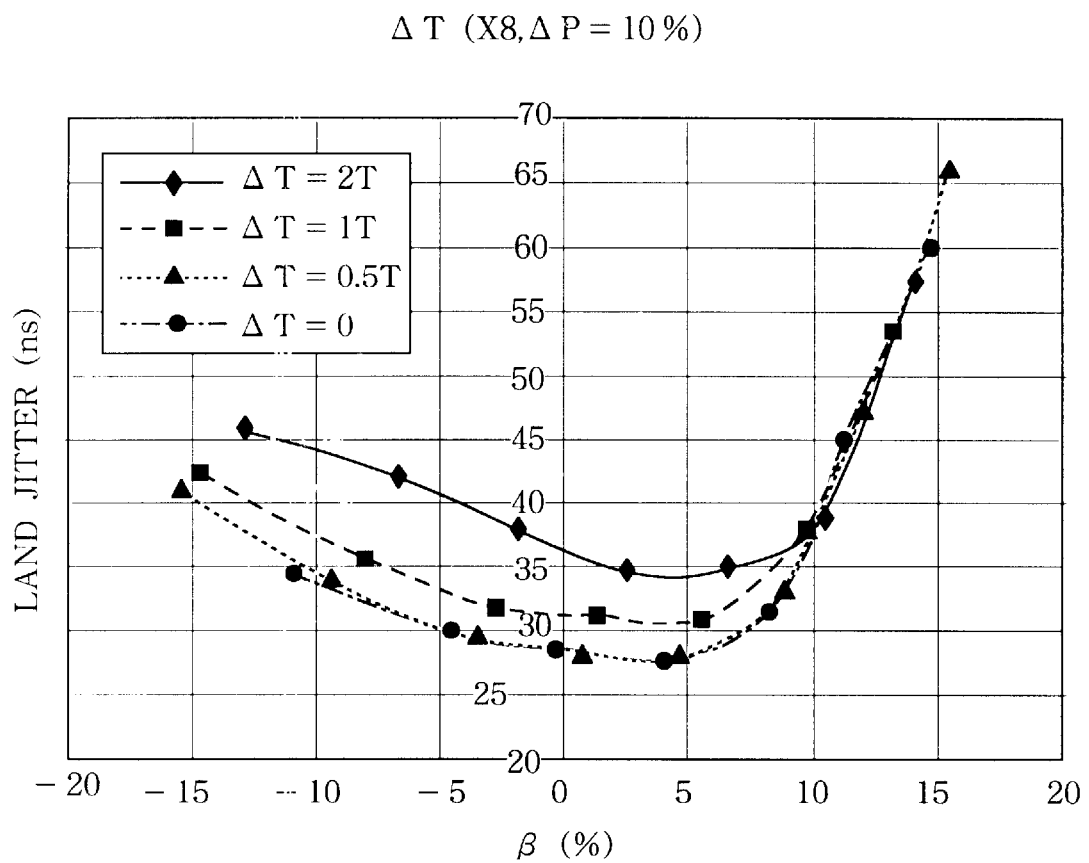
FIG. 6 is a graph illustrating 3T-land jitter characteristics observed in reproduction of signals recorded on the cyanine-based optical disk, using the recording laser beam power of FIG. 4, at an eight-times recording speed while variously changing the width of the top-power increasing pulse.

In FIG. 5, there are shown 3T-land jitter characteristics of signals recorded at the quadruple recording speed, from which it can been seen that the appropriate value of the widthΔ T of the top-power increasing pulse is 0.5T or 1.0T. Further, in FIG. 6, there are shown 3T-land jitter characteristics of signals recorded at the eight-times recording speed, from which it can been seen that the appropriate value of the widthΔ T of the top-power increasing pulse is 0T or 0.5T.

(2) AmplitudeΔ P

Figure 7:
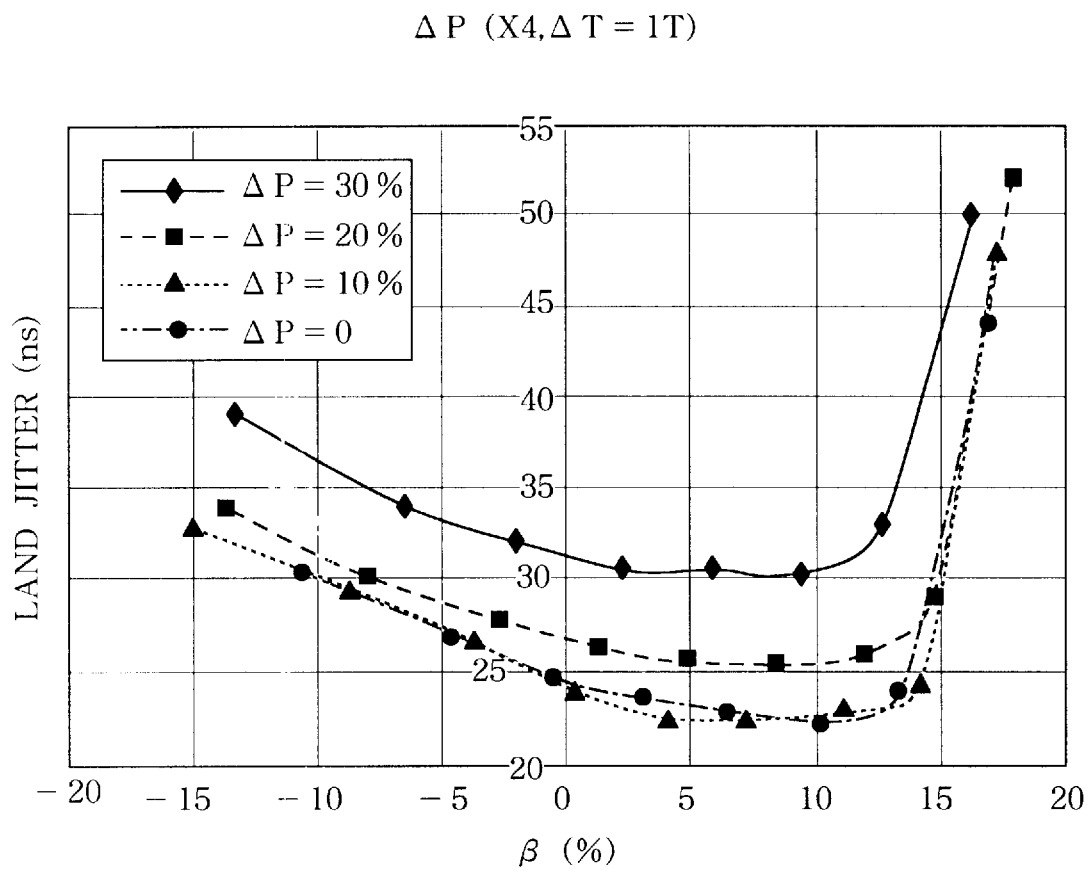
FIG. 7 is a graph illustrating 3T-land jitter characteristics observed in reproduction of signals recorded on the cyanine-based optical disk, using the recording laser beam power of FIG. 4, at the quadruple recording speed while variously changing an amplitude of the top-power increasing pulse.
Figure 8:
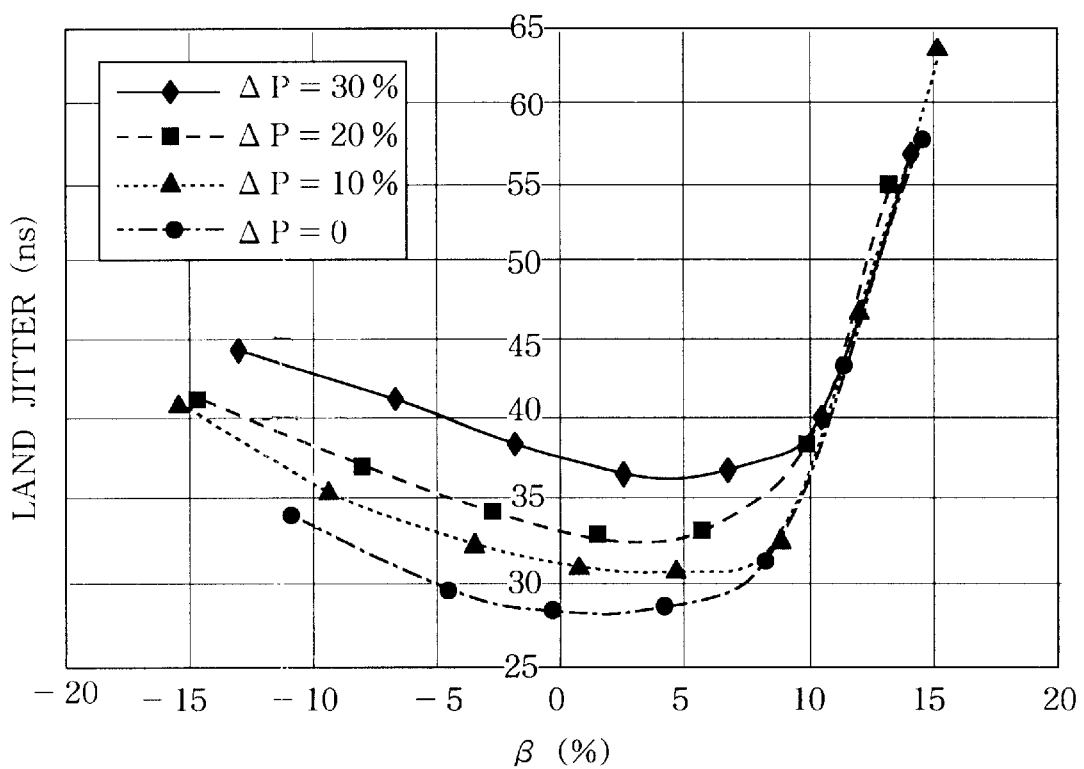
FIG. 8 is a graph illustrating 3T-land jitter characteristics observed in reproduction of signals recorded on the cyanine-based optical disk, using the recording laser beam power of FIG. 4, at the eight-times recording speed while variously changing the amplitude of the top-power increasing pulse.

In FIG. 7, there are shown 3T-land jitter characteristics of signals recorded at the quadruple recording speed, from which it can been seen that the appropriate value of the amplitudeΔ P of the top-power increasing pulse is 0% or 10%. Further, in FIG. 8, there are shown 3T-land jitter characteristics of signals recorded at the eight-times recording speed, from which it can been seen that the appropriate value of the amplitudesΔ P is 0%.

(3) DelayΔ D

Figure 9:
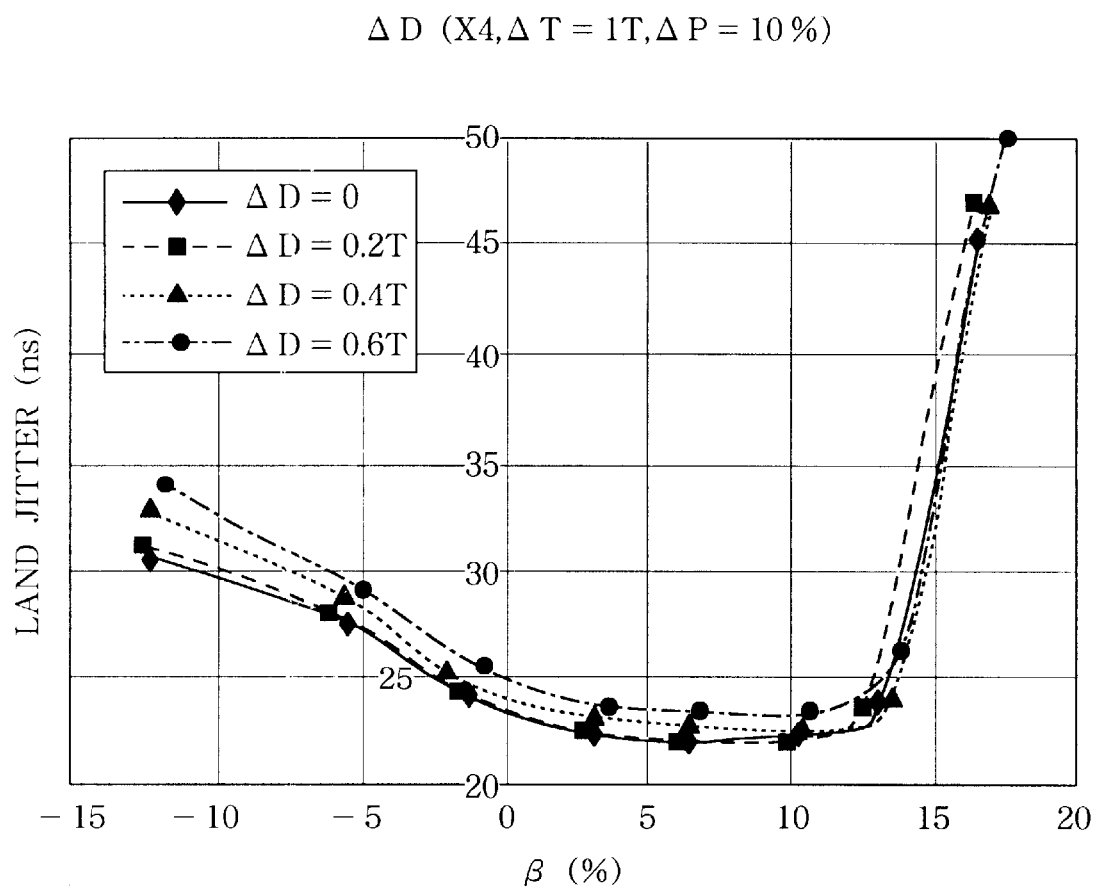
FIG. 9 is a graph illustrating 3T-land jitter characteristics observed in reproduction of signals recorded on the cyanine-based optical disk, using the recording laser beam power of FIG. 4, at the quadruple recording speed while variously changing a delay time of the top-power increasing pulse.
Figure 10:
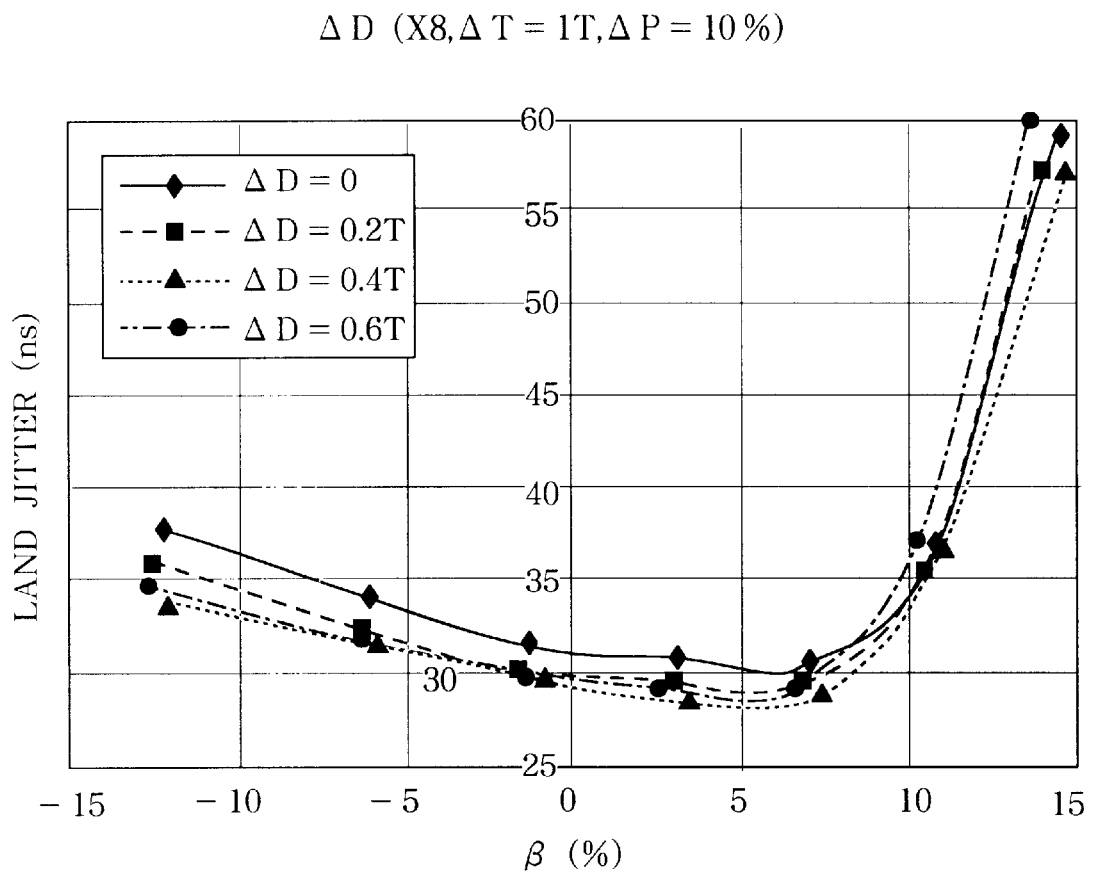
FIG. 10 is a graph illustrating 3T-land jitter characteristics observed in reproduction of signals recorded on the cyanine-based optical disk, using the recording laser beam power of FIG. 4, at the eight-times recording speed while variously changing the delay time of the top-power increasing pulse.

In FIG. 9, there are shown 3T-land jitter characteristics of signals recorded at the quadruple recording speed, from which it can been seen that the appropriate value of the delayΔ D of the top-power increasing pulse is 0T or 0.2T. Further, in FIG. 10, there are shown 3T-land jitter characteristics of signals recorded at the eight-times recording speed, from which it can been seen that the appropriate value of the delayΔ D is 0.2T or 0.4T.

Figure 11:
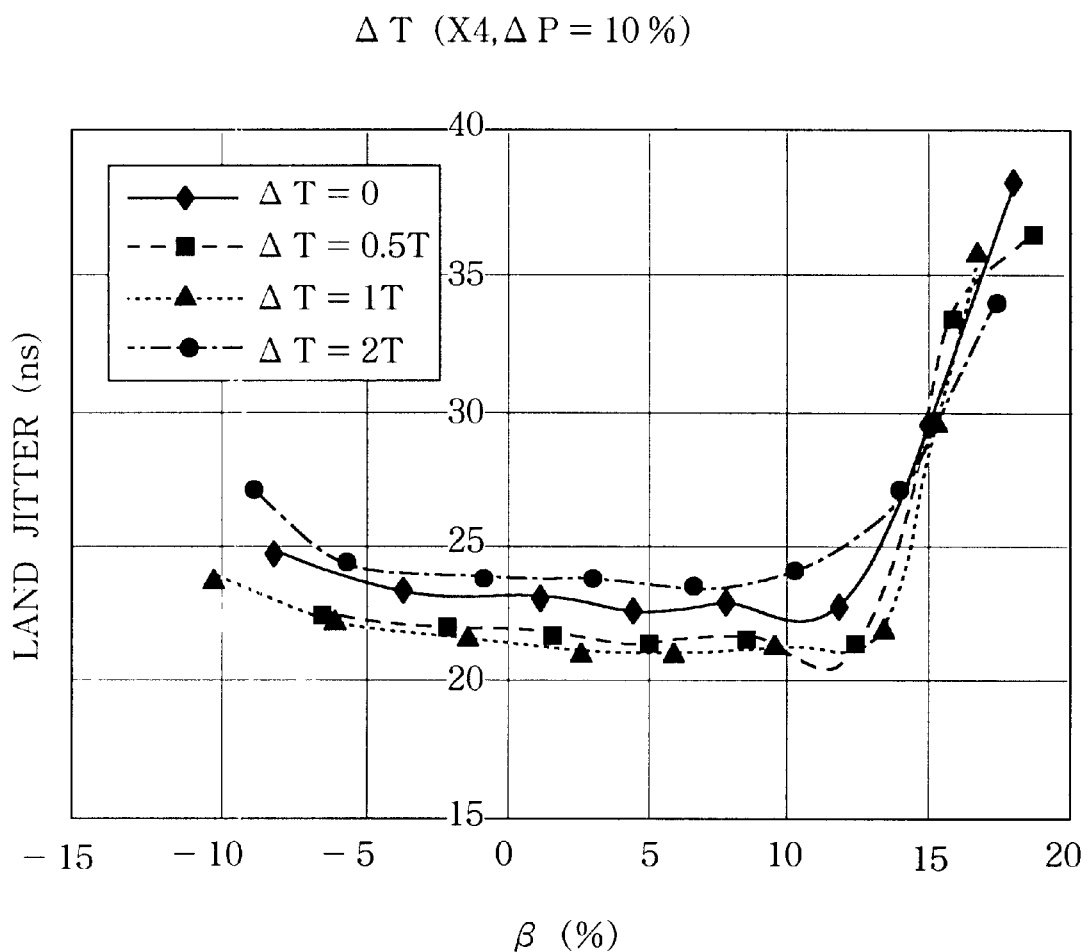
FIG. 11 is a graph illustrating 3T-land jitter characteristics observed in reproduction of signals recorded on a phthalocyanine-based optical disk, using the recording laser beam power of FIG. 4, at the quadruple recording speed while variously changing the width of the top-power increasing pulse.
Figure 12:
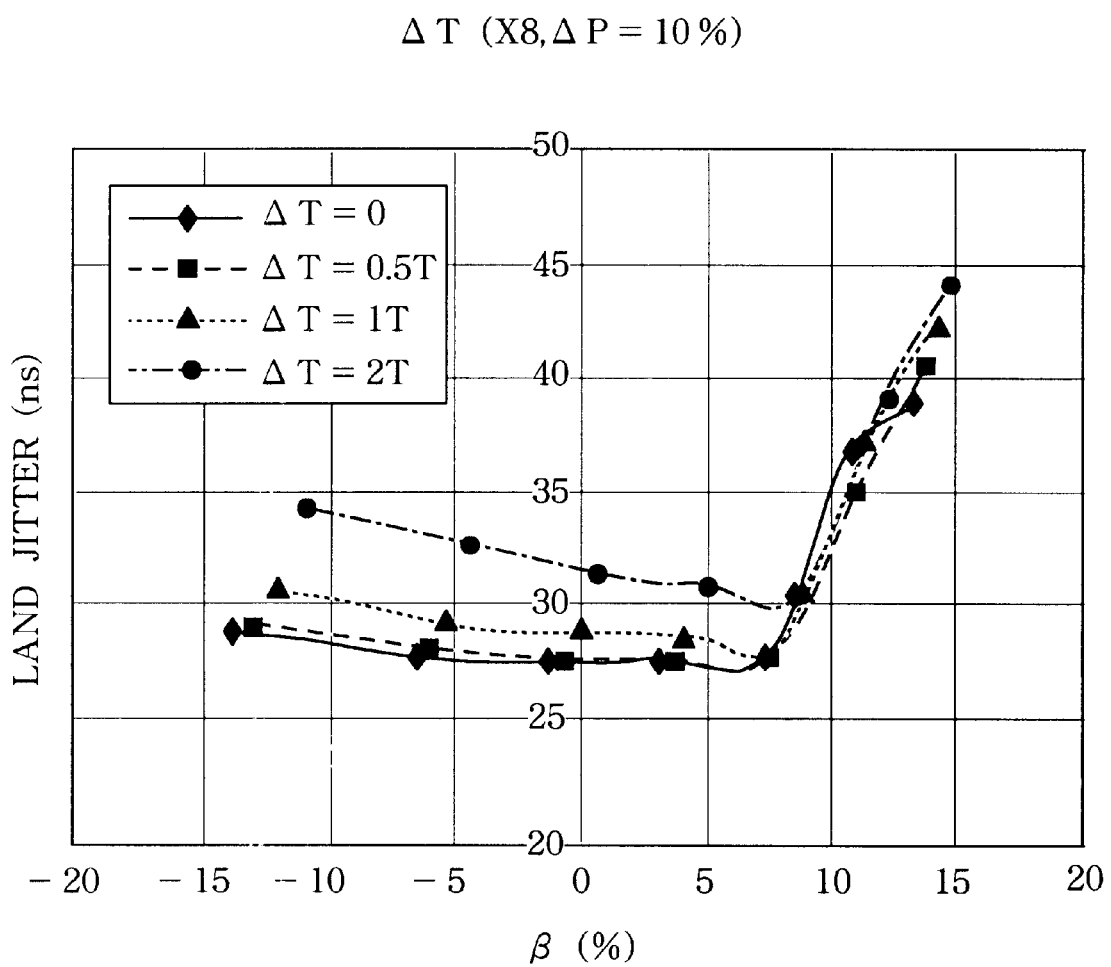
FIG. 12 is a graph illustrating 3T-land jitter characteristics observed in reproduction of signals recorded on the phthalocyanine-based optical disk, using the recording laser beam power of FIG. 4, at the eight-times recording speed while variously changing the width of the top-power increasing pulse.

FIGS. 11 and 12 are graphs illustrating 3T-land jitter characteristics observed in reproduction of signals recorded on a phthalocyanine-based CD-R disk, using the recording laser light of FIG. 4, at the quadruple and eight-times recording speeds while variously changing the values of the width ΔT of the top-power increasing pulse. More specifically, in FIG. 11, there are shown 3T-land jitter characteristics of signals recorded at the quadruple recording speed, from which it can been seen that the appropriate value of the widthΔ T of the top-power increasing pulse is 0.5T or 1.0T. Further, in FIG. 12, there are shown 3T-land jitter characteristics of signals recorded at the eight-times recording speed, from which it can been seen that the appropriate value of the pulse withΔ T is 0T or 0.5T. Namely, in this case, there were obtained the same results as in the case of the cyanine-based CD-R disk. Further, although not specifically shown, the same results as with the cyanine-based CD-R disk were obtained for the amplitudeΔ P and delayΔ D as well.

Further, in consideration of jitters and various other characteristics such as error rates including C1 error rates, optimum ranges of the ΔT, ΔP and ΔD values, which are believed to properly apply to cyanine-based and phthalocyanine-based optical disks supplied by various manufactures, have been determined by the inventors of the present invention, as shown in Table 1–Table 3 below, for every recording speed increase ratio.

TABLE 1

| Recording Speed | Normal | Double | Quadruple | Six-times | Eight-times | Ten-times |
|---|---|---|---|---|---|---|
| ΔT | 1–2T | 0.5–1.5T | 0–1T | 0–0.7T | 0–0.5T | 0–0.3T |

TABLE 2

| Recording Speed | Normal | Double | Quadruple | Six-times | Eight-times | Ten-times |
|---|---|---|---|---|---|---|
| ΔP | 10–30% | 5–20% | 0–15% | 0–10% | 0–5% | 0–5% |

TABLE 3

| Recording Speed | Normal | Double | Quadruple | Six-times | Eight-times | Ten-times |
|---|---|---|---|---|---|---|
| ΔD | 0T | 0T | 0–0.2T | 0–0.4T | 0–0.6T | 0–0.8T |

As can be seen from the tables above, it is preferable that the ΔT and ΔP values be made smaller as the recording speed increase ratio is raised and that the ΔD value be made greater as the recording speed increase ratio is raised. Further, at the quadruple recording speed and higher, all of the ΔT, ΔP and ΔD values may be set to zero so as to impart no top-power increasing pulse. Thus, if the optical disk recording apparatus is designed to record any information at a recording speed equal to or higher than the six-times recording speed, it is possible to completely eliminate the need for imparting the top-power increasing pulse and thus dispense with circuits pertaining to the impartment of the top-power increasing pulse, which thereby can reduce the necessary costs of the optical disk recording apparatus.

Figure 13:
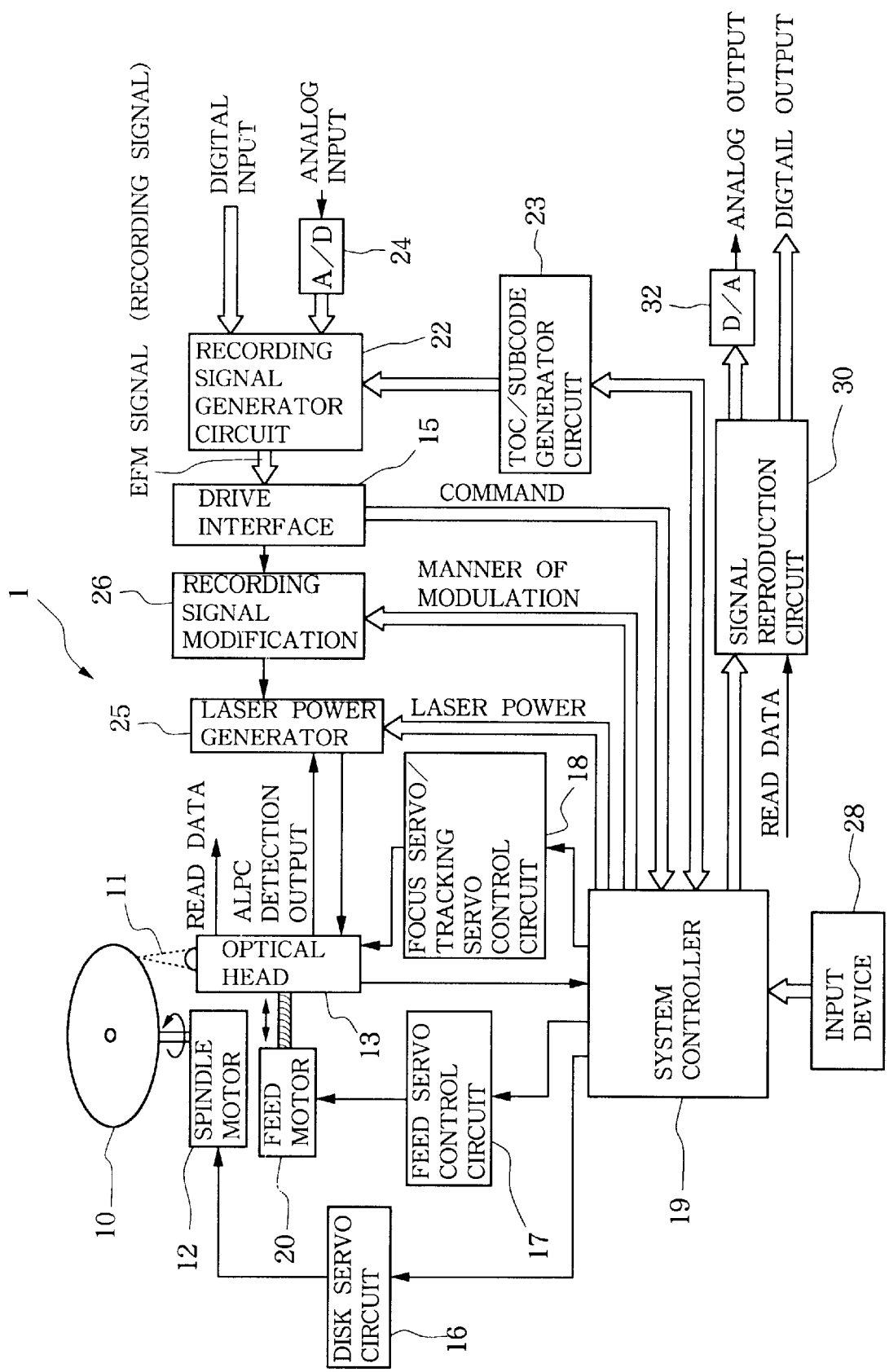
FIG. 13 is a block diagram showing an overall system organization of an optical disk recording/reproducing apparatus in accordance with a preferred embodiment of the present invention.

Now, a detailed description will be made about the optical disk recording apparatus which is designed to record desired information onto an optical disk by setting the width ΔT, amplitude ΔP and delay ΔD of the top-power increasing pulse to the values within the ranges of Table 1–Table 3. FIG. 13 is a block diagram showing an exemplary overall system organization of an optical disk recording/reproducing apparatus 1 to which are applied the basic principles of the present invention. Input device 28 is provided for a user or human operator to select a desired recording speed, i.e., a desired recording speed increase ratio. In accordance with an instruction from a system controller 19, a disk servo circuit 16 controls a spindle motor 12 to rotate at a constant linear velocity corresponding to the user-selected recording speed increase ratio; that is, the spindle motor 12 is driven at a linear velocity of 1.2 m/s–1.4 m/s when the normal recording speed is selected (hereinafter "standard linear velocity"), twice as fast as the standard linear velocity when the double recording speed is selected, four times as fast as the standard linear velocity when the quadruple recording speed is selected, six times as fast as the standard linear velocity when the six-times recording speed is selected, eight times as fast as the standard linear velocity when the eight-times recording speed is selected, and so on. Because the CD-WO standard prescribes that the "pre-groove wobbles" should fall at a frequency of 22.05 kHz, so that the constant linear velocity can be realized by detecting the wobbles from an output signal produced by an optical head 13 (e.g., from a residual component of a tracking error signal) and then PLL (Phase Locked Loop)-controlling the spindle motor 12 in such a manner that the detected wobbles fall at a predetermined frequency, i.e., 22.05 kHz at the normal recording seed, 44.1 kHz at the double recording speed, 88.2 kHz at the quadruple recording speed, 132.3 kHz at the six-times recording speed, 176.4 kHz at the eight-times recording speed, and so on.

Focus servo/tracking servo control circuit 18 performs focusing and tracking control on a laser light beam 11 emitted by a semiconductor laser provided within the optical head 13, in accordance with an instruction given from the system controller 19. Here, the tracking control is effected by detecting a pre-groove formed in the optical disk 10. Further, a feed servo control circuit 17 drives a feed motor 20 to move the optical head 13 along the radius of the optical disk 10, in accordance with an instruction given from the system controller 19.

Individual input signals or data to be recorded on the optical disk 10 (in this case, CD-WO disk commonly called a "CD-R") are introduced directly into a recording signal generator circuit 22, at a rate corresponding to the selected recording speed, if they are in digital form, but the input signals or data are introduced into the recording signal generator circuit 22 via an A/D converter 24 if they are in analog form. The recording signal generator circuit 22 interleaves the input data with necessary error check codes and imparts, to the input data, TOC (Table-Of-Content) information and subcode information generated by a TOC/subcode generator circuit 23. Then, the recording signal generator circuit 22 subjects the interleaved input data to an EFM modulation to form and output, as a recording signal, a series of data in a CD-standard format at a transfer rate corresponding to the selected recording speed.

The recording signal thus output from the generator circuit 22 is then passed via a drive interface 15 to a recording signal modification circuit 26, where the recording signal is subjected to a further modulation as dictated by a recording strategy selected on the basis of the type of the disk used (such as a dye material used in the disk's recording layer, disk manufacturer, etc.), linear velocity, selected recording speed, etc. The thus-modulated recording signal from the modification circuit 26 is delivered to a laser power generator circuit 25, which drives the semiconductor laser within the optical head 13 to irradiate a laser light beam onto the recording surface of the optical disk 10 for formation of desired pits. The laser power irradiation from the semiconductor laser is set to a specified level or value corresponding to the selected recording speed and, if necessary, to the liner velocity, and it is further controlled by an ALPC (Automatic Laser Power Control) circuit so as to be precisely set to the specified power level. In this manner, desired data can be recorded on the optical disk 10 in the CD standard format at the CD standard transfer rate and at the linear velocity of 1.2 m/s–1.4 m/s. Here, the top power level Pt of the laser light beam is made higher as the recording speed is increased.

Subsequently, as a reproducing laser light beam is irradiated onto the optical disk 10 having the data recorded in the above-described manner, the recorded data are read out from the disk 10 to be demodulated by a signal reproduction circuit 30 and then output directly in digital form or after being converted into analog representation by a D/A converter 31.

Figure 1:
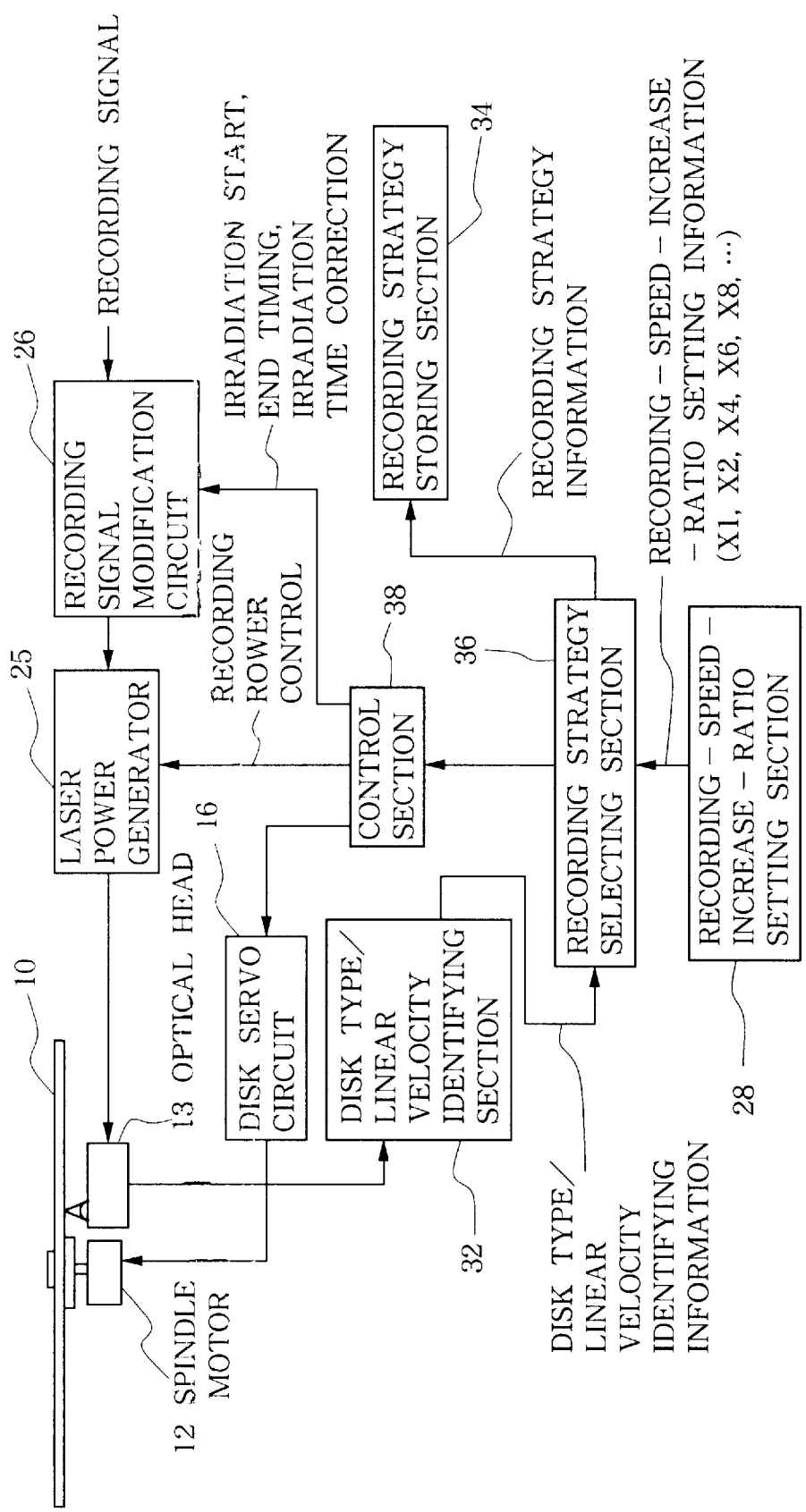
FIG. 1 is a control block diagram explanatory of various control functions performed in the present invention.
Figure 2A:
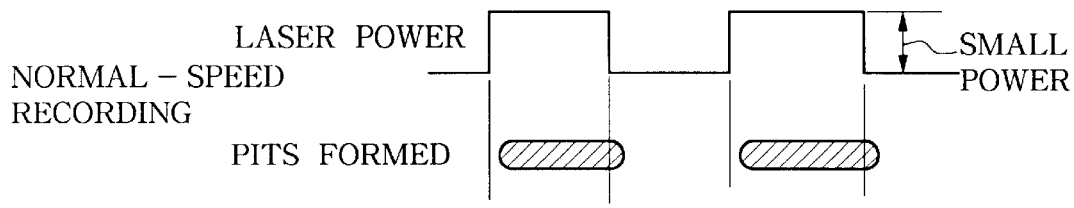
FIGS. 2A and 2B are diagrams showing pulse waveforms of a laser light beam conventionally used in low-speed and high-speed recording on an optical disk and pits formed by such a laser light beam.
Figure 2B:
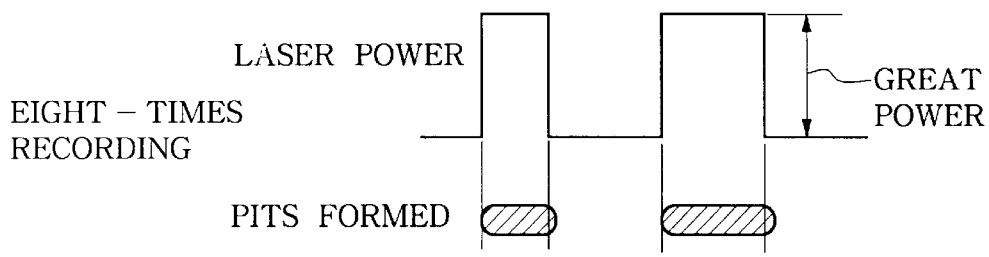
Figure 3:
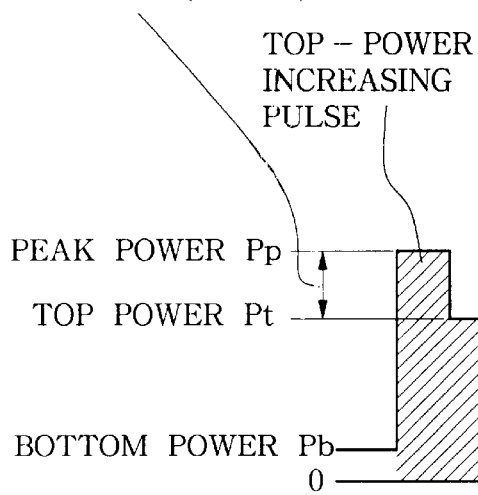
FIG. 3 is a diagram showing various pulse waveforms of a recording laser light beam used in the present invention to achieve a uniform recording depth of pits.
Figure 3:
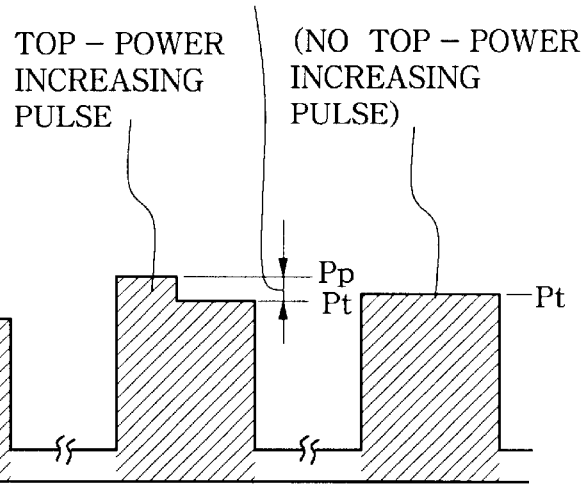

Further, FIG. 1 is a control block diagram explanatory of various control functions performed by the system controller 19 of FIG. 13. In FIG. 1, a recording-speed-increase-ratio setting section 28 corresponds to the input device 28 of FIG. 13, which sets a recording speed increase ratio (x1, x2, x4, x6, x8, . . . ) selected by the human operator. Disk type/linear velocity identifying section 32 identifies the type and linear velocity of the optical disk 10 having been installed in the optical disk recording/reproducing apparatus. The disk type can be identified, for example, from disk type information included in various pieces of ID information pre-recorded on the optical disk 10; alternatively, disk-type selecting switches may be provided so that information representative of the disk type may be entered manually by the user selectively manipulating any of these switches. Further, the linear velocity can be identified by reading out a recording time (63 minutes, 74 minutes or another time intermediate between these two times) pre-recorded, for example, as part of the ATIP signal in the disk's lead-in area and then determining a linear velocity corresponding to the recording time (1.4 m/s for the 63-minute type, or 1.2 m/s for the 74-minute type), or from an encoder output of the spindle motor.

Further, in FIG. 1, a recording strategy storing section 34 has prestored therein various recording strategies (time variation patterns, recording laser beam power levels, etc.), each of which is intended for generating recording pulses of FIG. 4 in settings within the ranges indicated by any one of Table 1–Table 3 above and in accordance with a combination of the disk type, linear velocity and selected recording speed increase ratio. Further, a recording strategy selecting section 36 reads out, from the storing section 34, one of the recording strategies which corresponds to the disk type, linear velocity and selected recording speed increase ratio that are input to the optical disk recording/reproducing apparatus. In accordance with the read-out recording strategy, a control section 38 controls the recording signal modification circuit 26 to modulate the respective lengths of pit-forming and blank-forming periods of the recording signal. The control section 38 also controls the laser power generator circuit 25 so as to set the recording laser light beam power (i.e., bottom power level Pb, top power level Pt and peak power level Pp) to values predetermined for the selected recording speed increase ratio. The control section 38 also controls the disk servo circuit 16 so that the spindle motor 12 is set to a rotation speed corresponding to the selected recording speed increase ratio. In this way, desired recording can be performed on the optical disk 10. Note that other details than the above-mentioned are set in accordance with the standard of Orange Book II, Vol. 3.0.

In the case where the apparatus is designed to record any information at a recording speed equal to or higher than the six-times recording as mentioned above, the recording-speed-increase-ratio setting section 28 of FIG. 1 may be omitted and arrangements may be made to set a fixed recording speed increase ratio equal to or higher than the six-times recording speed; alternatively, the recording-speed-increase-ratio setting section 28 of FIG. 1 may be used by the user to select a variable recording speed increase ratio equal to or higher than the six-times recording speed. Further, in this case, the control section 38 is prevented from imparting a top-power increasing pulse to the recording pulse.

Finally, it should also be appreciated that the basic principles of the present invention are applicable to optical disks based on any other standards than the CD standard, such as the DVD standard.

What is claimed is:

1. An optical disk recording apparatus capable of recording information onto an optical disk in a variable recording speed increase ratio, said optical disk recording apparatus recording the information by irradiating a recording laser light beam onto a recording surface of the optical disk with the recording laser light beam set to a top power level for each pit-forming period and to a bottom power level for each land-forming period between pit-forming periods to thereby form pits and lands on the optical disk based on a mark-length recording scheme, said optical disk recording apparatus comprising a control section which performs control to impart a top-power increasing pulse to part of a top power irradiation period of the recording laser light beam to temporarily increase the top power level thereof and also performs, for pits of a same length, control to decrease a ratio, to a unit pit length, of a width of the top-power increasing pulse as the recording speed increase ratio is raised.

2. An optical disk recording apparatus capable of recording information onto an optical disk in a variable recording speed increase ratio, said optical disk recording apparatus recording the information by irradiating a recording laser light beam onto a recording surface of the optical disk with the recording laser light beam set to a top power level for each pit-forming period and to a bottom power level for each land-forming period between pit-forming periods to thereby form pits and lands on the optical disk based on a mark-length recording scheme, said optical disk recording apparatus comprising a control section which performs control to impart a top-power increasing pulse to part of a top power irradiation period of the recording laser light beam to temporarily increase the top power level thereof and performs, for pits of a same length, control to decrease a ratio, to a difference between the top power level and the bottom power level, of a difference between a peak level of the top-power increasing pulse and the top power level as the recording speed increase ratio is raised.

3. An optical disk recording apparatus capable of recording information onto an optical disk in a variable recording speed increase ratio, said optical disk recording apparatus recording the information by irradiating a recording laser light beam onto a recording surface of the optical disk with the recording laser light beam set to a top power level for each pit-forming period and to a bottom power level for each land-forming period between pit-forming periods to thereby form pits and lands on the optical disk based on a mark-length recording scheme, said optical disk recording apparatus comprising a control section which performs control to impart a top-power increasing pulse to part of a top power irradiation period of the recording laser light beam to temporarily increase the top power level thereof and performs, for pits of a same length, control to increase a ratio, to a unit pit length, of a delay of a rise of the top-power increasing pulse from a start of the top power irradiation period as the recording speed increase ratio is raised.

4. An optical disk recording apparatus capable of recording information onto an optical disk in a variable recording speed increase ratio, said optical disk recording apparatus recording the information by irradiating a recording laser light beam onto a recording surface of the optical disk with the recording laser light beam set to a top power level for each pit-forming period and to a bottom power level for each land-forming period between pit-forming periods to thereby form pits and lands on the optical disk based on a mark-length recording scheme, said optical disk recording apparatus comprising a control section which performs control to impart a top-power increasing pulse to part of a top power irradiation period of the recording laser light beam to temporarily increase the top power level thereof and performs a combination of two or more of:

control to decrease a ratio, to a unit pit length, of a width of the top-power increasing pulse as the recording speed increase ratio is raised, for pits of a same length;

control to decrease a ratio, to a difference between the top power level and the bottom power level, of a difference between a peak level of the top-power increasing pulse and the top power level as the recording speed increase ratio is raised, for pits of a same length; and control to increase a ratio, to a unit pit length, of a delay of a rise of the top-power increasing pulse from a start of the top power irradiation period as the recording speed increase ratio is raised, for pits of a same length.

5. An optical disk recording apparatus as claimed in claim 1 wherein said control section performs control to not impart the top-power increasing pulse when the recording speed increase ratio is higher than a predetermined value.

6. An optical disk recording apparatus as claimed in claim 2 wherein said control section performs control to not impart the top-power increasing pulse when the recording speed increase ratio is higher than a predetermined value.

7. An optical disk recording apparatus as claimed in claim 3 wherein said control section performs control to not impart the top-power increasing pulse when the recording speed increase ratio is higher than a predetermined value.

8. An optical disk recording apparatus as claimed in claim 4 wherein said control section performs control to not impart the top-power increasing pulse when the recording speed increase ratio is higher than a predetermined value.

9. An optical disk recording apparatus which records information onto an optical disk in a variable or fixed recording speed increase ratio equal to or higher than a six-times recording speed, said optical disk recording apparatus recording the information by irradiating a recording laser light beam onto a recording surface of the optical disk with the recording laser light beam set to a top power level for each pit-forming period and to a bottom power level for each land-forming period between pit-forming periods to thereby form pits and lands on the optical disk based on a mark-length recording scheme, said optical disk recording apparatus comprising a control section which, in recording in the variable or fixed recording speed increase ratio, performs control to keep constant the top power level of the recording laser light beam without imparting a top-power increasing pulse to a top power irradiation period of the recording laser light beam.

* * * * *